(12) United States Patent
Gailloux et al.

(10) Patent No.: US 10,909,602 B1
(45) Date of Patent: Feb. 2, 2021

(54) MOBILE COMMUNICATION DEVICE UPGRADE DELIVERY DIFFERENTIATION

(71) Applicant: Sprint Communications Company L.P., Overland Park, KS (US)

(72) Inventors: Michael A. Gailloux, Overland Park, KS (US); Vanessa L. Suwak, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 414 days.

(21) Appl. No.: 15/723,080

(22) Filed: Oct. 2, 2017

(51) Int. Cl.
| G06Q 30/06 | (2012.01) |
| G06Q 10/10 | (2012.01) |
| G06Q 10/08 | (2012.01) |
| H04W 8/18 | (2009.01) |
| G06Q 10/06 | (2012.01) |

(52) U.S. Cl.
CPC ..... G06Q 30/0631 (2013.01); G06Q 10/0875 (2013.01); G06Q 10/1095 (2013.01); G06Q 30/0639 (2013.01); G06Q 10/067 (2013.01); H04W 8/18 (2013.01)

(58) Field of Classification Search
CPC .......... G06Q 30/0631; G06Q 10/0875; G06Q 10/1095; G06Q 30/0639; G06Q 10/067; H04W 8/18
See application file for complete search history.

(56) References Cited

U.S. PATENT DOCUMENTS

| 7,720,074 B2 * | 5/2010 | Chewning, III | .... H04L 41/0806 370/237 |
| 2010/0082397 A1 * | 4/2010 | Blegen | ............... G06Q 30/02 705/14.58 |
| 2010/0171826 A1 * | 7/2010 | Hamilton | ............... G06Q 30/06 348/135 |

(Continued)

OTHER PUBLICATIONS

"Bundle Programming Guide", Mar. 1, 2013, reprinted from the Internet at: https://developerapple.com/library/ios/documentation/CoreFoundation/Conceptual/CFBundles/CFBundles.pdf, 53 pgs. (2013) (Year: 2013).*

(Continued)

*Primary Examiner* — Patricia H Munson
*Assistant Examiner* — Thea Labogin

(57) ABSTRACT

A system for mobile communication device upgrade delivery and configuration. The system comprises a processor, a non-transitory memory, and a business process management application stored in the non-transitory memory. When executed by the processor, the application receives a message from a device upgrade client application executing on a mobile communication device requesting an upgrade mobile communication device, accesses data associated with the mobile communication device requesting the upgrade device stored in an interaction history data store, and analyzes the data accessed from the interaction history data store. The business process management application further, based on the analysis of the data and based on the model of upgrade device, recommends pick-up of the upgrade device (Continued)

in a retail store, identifies a retail store, and sends a recommendation message to the device upgrade client application that the upgrade mobile communication device be picked up at the retail store.

13 Claims, 8 Drawing Sheets

(56) References Cited

U.S. PATENT DOCUMENTS

| | | | | |
|---|---|---|---|---|
| 2010/0262481 | A1* | 10/2010 | Baker | G06Q 10/30 |
| | | | | 705/14.23 |
| 2011/0125601 | A1* | 5/2011 | Carpenter | G06Q 30/06 |
| | | | | 705/26.1 |
| 2013/0080289 | A1* | 3/2013 | Roy | G06Q 10/10 |
| | | | | 705/26.8 |
| 2016/0335686 | A1* | 11/2016 | Athulurutlrumala | |
| | | | | G06F 3/0482 |

OTHER PUBLICATIONS

"Bundle Programming Guide", 2010, reprinted from the Internet at: https://developerapple.com/library/ios/documentation/CoreFoundation/Conceptual/CFBundles/CFBundles.pdf, 53 pgs. (2010) (Year: 2010).*
"IPhone Pre-Ordering Tips: Unlocked No Contact, Jet Black Getting on Sep. 16", Phone Battles , Sep. 9, 2016 https://www.youtube.com/watch?v=9Wp2CbP7Ue4 (Year: 2016).*
"Make an Online Appointment at the AT&T Store?", Taylor, Dave, Aug. 2017 (Year: 2017).*
"Top 5 Things that could kill your iPhone", Box Desire, Sep. 26, 2014 http://www.youtube.com/watch?v=4Xd6o49rX9g (Year: 2014).*
How to set up an iPhone 7 unbox and setup your new iPhone, Macworld UK, Sep. 2016 https://www.youtube.com/watch?v=AtE3GuUYjl0 (Year: 2016).*
T-Mobile upgrade phone date Sep. 2017 https://www.youtube.com/watch?v=dOwVXsOXie4 ; (Year: 2017).*

* cited by examiner

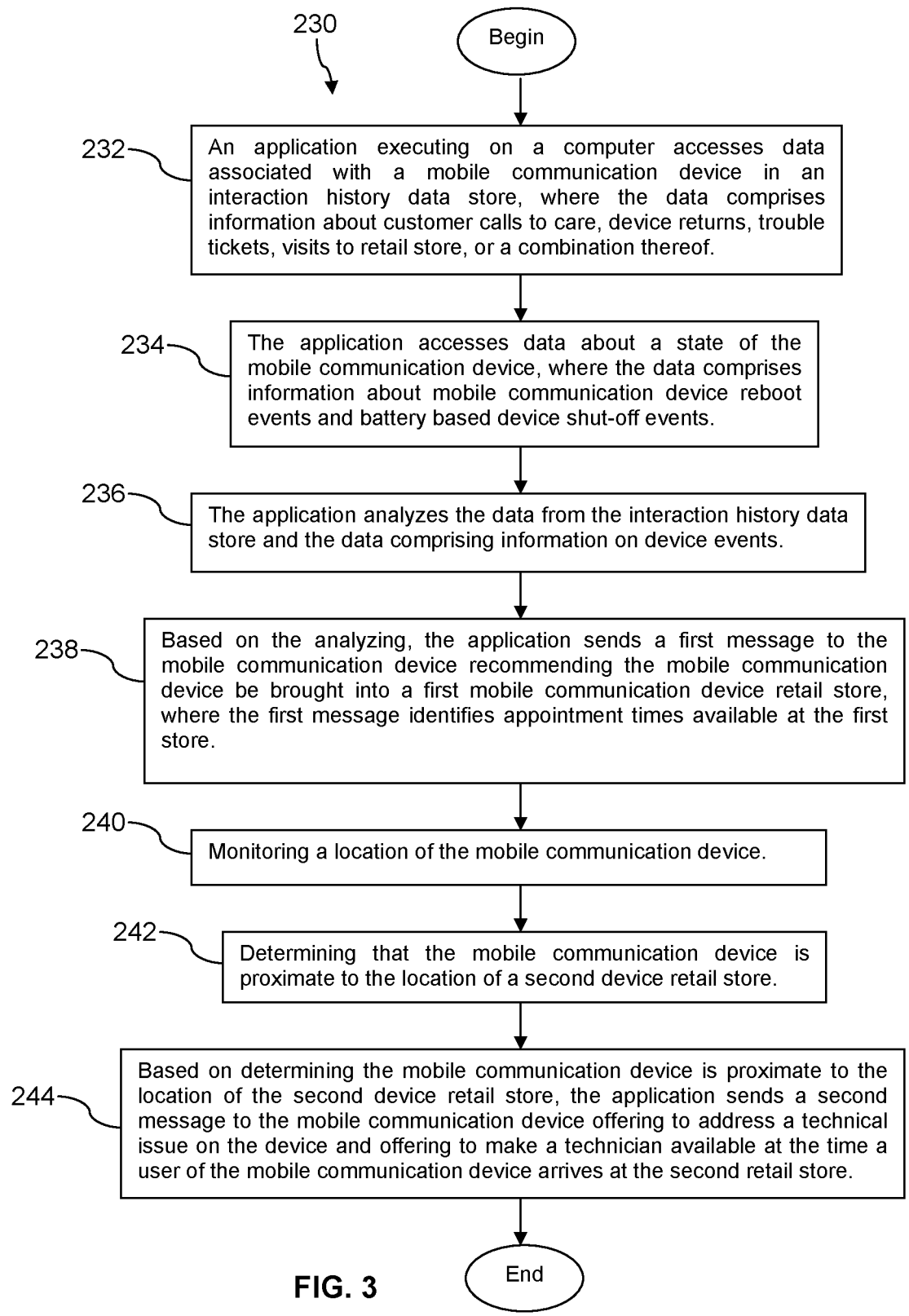

MOBILE COMMUNICATION DEVICE UPGRADE DELIVERY DIFFERENTIATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices have become a very popular consumer electronic device and provide nearly ubiquitous communication service. Further, mobile communication devices have become computers in their own right that support many other functions that go beyond basic communication, such as navigation applications, gaming applications, calendars, and other concierge-like services. Original equipment manufacturers and, to a lesser extent, wireless communication service providers compete in the device marketplace by maintaining a rapid pace of technological innovation. Some users are keen to obtain the latest state-of-the-art mobile communication device as soon as it hits the market. The process of transitioning from an older model of phone to a newer model of phone is typically referred to as upgrading and the newer phone may be referred to as an upgrade or an upgrade phone.

SUMMARY

In an embodiment, a system for mobile communication device upgrade delivery and configuration is disclosed. The system comprises a processor, a non-transitory memory, and a business process management application stored in the non-transitory memory. When executed by the processor, the business process management application receives a message from a device upgrade client application executing on a mobile communication device requesting an upgrade mobile communication device, where the message identifies a model of upgrade mobile communication device, accesses data associated with the mobile communication device requesting the upgrade device stored in an interaction history data store, where the data comprises information about customer calls to care, device returns, trouble tickets, visits to retail store, or a combination thereof, and analyzes the data accessed from the interaction history data store based on the model of upgrade mobile communication device identified in the message received from the device upgrade client application. The business process management application further, based on the analysis of the data accessed from the interaction history data store and based on the model of upgrade mobile communication device identified in the message from the device upgrade client application, decides to recommend to a user of the mobile communication device to pick-up the upgrade mobile communication device in a retail store, accesses an inventory management system that tracks locations of mobile communication device inventor, and identifies a retail store based on a proximity of the mobile communication device to the retail store location and based on the retail store having the upgrade mobile communication device in stock. The business process management application further sends a recommendation message to the device upgrade client application that the upgrade mobile communication device be picked up at the retail store, wherein the recommendation message comprises identification of available appointment times at the retail store, prompts the device upgrade client application to select an available appointment time, receives an appointment time selection message from the device upgrade client application, and places an inventory lock on the upgrade mobile communication device at the retail store, whereby the upgrade mobile communication device is blocked from provisioning to a different wireless subscription account for a predefined period of time.

In another embodiment, a method of delivering and configuring a mobile communication device is disclosed. The method comprises receiving a message by an application executing on a computer system from a device upgrade client application executing on a mobile communication device requesting an upgrade mobile communication device, where the message identifies a model of upgrade mobile communication device, accessing data associated with the mobile communication device requesting the upgrade device stored in an interaction history data store by the application, where the data comprises information about customer calls to care, device returns, trouble tickets, visits to retail store, or a combination thereof, and analyzing the data accessed from the interaction history data store by the application based on the model of upgrade mobile communication device identified in the message received from the device upgrade client application. The method further comprises, based on the analysis of the data accessed from the interaction history data store and based on the model of upgrade mobile communication device identified in the message from the device upgrade client application, deciding by the application to recommend to a user of the mobile communication device to pick the upgrade mobile communication device in a retail store, accessing an inventory management system that tracks locations of mobile communication device inventory by the application, and identifying a retail store based on a proximity of the mobile communication device to the retail store location and based on the retail store having the upgrade mobile communication device in stock. The method further comprises sending a recommendation message to the device upgrade client application by the application that the upgrade mobile communication device be picked up at the retail store, wherein the recommendation message comprising identification of available appointment times at the retail store, prompting the device upgrade client application to select an available appointment time, receiving an appointment time selection message from the device upgrade client application by the application, and placing an inventory lock on the upgrade mobile communication device at the retail store, whereby the upgrade mobile communication device is blocked from provisioning to a different wireless subscription account for a predefined period of time.

In yet another embodiment, a method of managing mobile communication devices is disclosed. The method comprises accessing data associated with a mobile communication device in an interaction history data store by an application executing on a computer system, where the data comprises information about customer calls to care, device returns, trouble tickets, visits to retail store, or a combination thereof, accessing data about a state of the mobile communication device by the application, where the data comprises information about mobile communication device reboot events and battery based device shut-off events, and analyzing the data from the interaction history data store and the data comprising information on device events by the application. The method further comprises, based on the analyzing, sending a message by the application to the mobile communication device recommending the mobile communication device be brought into a first mobile communication device retail store, where the message identifies appointment times available at the first store, monitoring a location of the mobile communication device, determining that the mobile communication device is proximate to the location of a second device retail store, and based on determining the mobile communication device is proximate to the location of the second device retail store, sending a message by the application to the mobile communication device offering to address a technical issue on the device and offering to make a technician available at the time a user of the mobile communication device arrives at the second retail store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of another method according to an embodiment of the disclosure.

DETAILED DESCRIPTION

Figure 1:
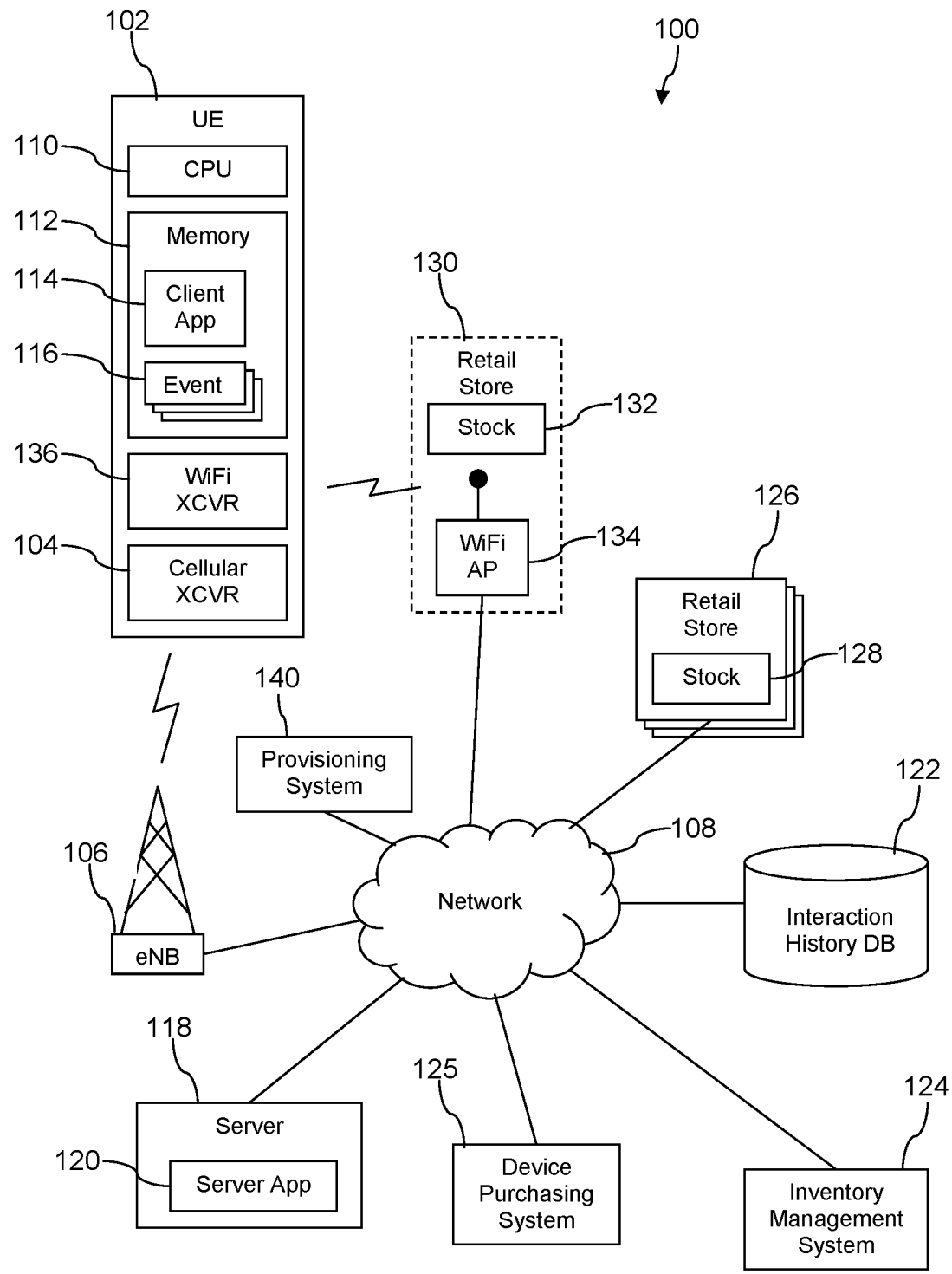
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Opportunities for improving customer interactions with a wireless communication service provider and for increasing the operating efficiencies of the wireless communication service provider can be identified by populating a user interaction history data store with user event data and thereafter analyzing the contents of the data store. User event data can include device reboot events, device low memory events, device battery low power events (e.g., battery power drops to a very low point and the device automatically powers off), mobile application install events, and other events. These kinds of device events can be harvested by a client application executing on the device which bundles up device event history and sends it to the interaction history data store. Records of calls to customer care by users likewise can be included in the interaction history data store. Information about trouble tickets opened for a user can be included in the interaction history data store. A device upgrade history of users can be included in the interaction history data store.

Based on analyzing the user interaction history data store information associated with a single user, for example a server application executing on a server computer analyzing the information, users who may be expected to independently complete a mobile communication device upgrade (activating the device, porting private data from old device to the upgrade device, learning how to use new features of the upgrade device, etc.) can be distinguished from other users who are better served to pick-up their upgrade device at a retail store and rely on trained professionals to activate the device and port their private data from their old device to their upgrade device. A history of being an early adopter of new technology and new upgrade devices may contribute to the inference that such a user can navigate the process of upgrading their device independently. Other indicators can support this inference, such as few calls to customer care about trivial technical phone issues that an average user would be able to work out on their own (turning on their WiFi radio, installing mobile applications on the device, configuring the brightness of their display, reconfiguring the display screen of the device [e.g., changing arrangements of icons on different screens] and the like). Users deemed capable of self-migrating to an upgrade model can be encouraged to have their upgrade device shipped directly to them rather than relying on retail store personnel to activate the device and port private data. This is probably more convenient for such a user, and it can be a more efficient use of retail store personnel, especially during the initial launch of a new flagship device.

On the other hand, recommending to less self-reliant users to instead pick-up their upgrade device in the retail store, based on the analysis described above, can provide a better experience to that user. They will get their device in service quicker. Their private data will be securely ported to the upgrade device without loss of data and without user frustration. Sometimes initial documentation on a recently released upgrade device is incomplete. While advanced or self-reliant users can probably figure things out on their own, for less technically able users sketchy documentation on newly released devices can be frustrating and negatively impact that user's opinion of the device and/or of the mobile communication service provider. If the less technically able are encouraged to pick-up their device in the store, store personnel can provide a brief summary of new features of the upgrade device, possibly providing in-depth description of some features that other users have had trouble understanding. This can also avoid a large number of calls to customer care to help the less self-reliant users over their difficulties experienced in activating their phone, porting private data over to the upgrade device, or learning to use new features of the upgrade device.

The server application can be notified when a user initiates an upgrade purchase and respond accordingly. The server application can perform the analysis described above and provide a recommendation to opt for direct delivery of the device or for in-store pick-up of the device. In the case of in-store pick-up of the device, the server application can determine a current location and/or a common location of the user's device (e.g., a work location, a residence location, another location where the user is frequently located). It can search for retail stores carrying the selected model of mobile communication device proximate to that location. It can access an inventory management system to determine if that model of device is in stock at which of the proximate stores. It can look at appointment schedules at the stores. It can provide one or more recommendations to the user to pick-up the device and have a skilled technician activate the device and port user data to the new device. If the user accepts the recommendation, the server application can place a temporary hold on the device so a store salesperson does not sell that device to another. During the roll-out of a new flagship device, sales may be brisk. This freeze can avoid the undesirable scenario of the user responding as prompted by the server application, driving to the retail store, and only then finding out that the device is not in fact in stock at that time!

It will be understood that the user interaction history data store comprises device event data from a plurality of mobile communication devices: tens of thousands of devices, hundreds or thousands of devices, millions of devices, even tens of millions of devices. The user interaction history data store can advantageously be analyzed to support other services that delight the user and enhance provider operating efficiencies. For example, a fault pattern may be identified in terms of observable device events reported by a plurality of other mobile communication devices and recorded in the interaction history data store. The event data associated with a user may be compared by the server application to the fault pattern. If the user event data matches the fault pattern closely enough, the server application can identify a retail store proximate to a current and/or common location of the device and send a notification to the device recommending the user take the device to the store for remediation. The server application may check remediation actions and coordinate with personnel schedules and/or verify stock of replacement parts (e.g., new battery) at the retail store. The server application may pop a notification window on a display of the device offering to schedule the appointment for the user to drop by the retail store.

Turning now to FIG. 1, a system 100 is described. In an embodiment, system 100 comprises a mobile communication device (user equipment [UE]) 102, a cell site 106, a network 108, a server computer 118 executing a server application 120, and an interaction history data store 122. The server application 120 may be referred to as a business process management application in some contexts herein. The mobile communication device 102 comprises a processor 110, a memory 112, a cellular radio transceiver 104, and a WiFi radio transceiver 136. In an embodiment, the mobile communication device 102 may be a mobile phone, a smart phone, a personal digital assistant (PDA), a wearable computer, a headset computer, a laptop computer, a tablet computer, or a notebook computer.

The cellular radio transceiver 104 may obtain a wireless communication link from the cell site 106. The cell site 106 may provide the wireless communication link to the cellular radio transceiver 104 according to a long term evolution (LTE), a code division multiple access (CDMA), a global system for mobile communications (GSM), or a worldwide interoperability for microwave access (WiMAX) telecommunication protocol. The cell site 106 may communicatively couple the device 102 to the network 108 and therethrough to other wireless communication devices, content servers, or application servers. The network 108 comprises one or more private networks, one or more public networks, or a combination thereof. While one wireless communication device 102 and one cell site 106 are illustrated in FIG. 1, it is understood the system 100 may comprise any number of wireless communication devices and cell sites.

The mobile communication device 102 further comprises a client application 114 stored in the memory 112, for example stored in a non-transitory portion of the memory 112. The client application 114 may capture and store device events 116 in the memory 112, for example in the non-transitory portion of the memory 112. The device events 116 comprise information about events of interest that occur on the device 102. The device events 116 may comprise an identity of the device 102, for example a mobile equipment identity (MEID), a phone number, or some other unique identifier. The device events 116 may comprise a date and time associated with the subject event. The device events may comprise contextual information, such as services or peripherals (battery power level, WiFi radio transceiver power state, Bluetooth® power state, Internet connection, applications being executed, etc.) of the device 102 that were operating at the time of the event. The device event also identifies a category or subject of the event that answers the question "what is the event?" The event can be a reboot of the device 102. The event can be an automatic power down resulting from low battery condition. The event can be a low memory condition (a mobile application crashing due to lack of memory). The event can be installing a mobile application on the device 102. The event can be reconfiguring a display screen of the device 102. Other circumstances can be the subject of the device events 116.

The client application 114 may send the events to the server 118 and/or the server application 120 from time to time—for example periodically and/or when the number of device events 116 exceeds a predefined threshold. After sending the device events 116 to the server 118, the client application 114 may delete the device events 116 from the memory 112 to conserve space. The server 118 writes the device events 116 received from the device 102 to the user interaction history data store 122. In another embodiment, the client application 114 writes the device events 116 to the user interaction history data store 122 without the mediation of the server 118. Other information may be entered into the user interaction history data store 122 by the server 118 and/or by other systems (not shown). For example, information about user interactions with a customer care facility of a wireless communication service provider (e.g., calls to care) may be entered and stored in the interaction history data store 122. User interactions with interactive voice recognition (IVR) systems may be entered and stored in the interaction history data store 122. User history of purchasing of mobile communication devices 102 (e.g., an upgrade history) may be entered and stored in the interaction history data store 122. History of downloads of mobile applications onto the device 102 may be stored in the interaction history data store 122, either by the client application 114 sending this information or by an application store (not shown) in the system 100 sending this information to the interaction history data store 122 and/or to the server application 120.

The server application 120 may receive notice when the user associated with the mobile communication device 102 takes action initiating upgrading the device 102 (i.e., replacing an old device with a new device, typically a later generation model device). For example, a trigger may be set on a device purchasing system 125 such that when the user takes initial steps of ordering an upgrade device, notification is sent by the device purchasing system to the server application 120. Alternatively, the server application 120 may register to listen to device purchase initiation events with the device purchasing system 125. In an embodiment, the client application 114 or other application on the device 102 may detect the initiation of ordering an upgrade device and send notice to the server application 120.

The server application 120, when notified of the user of the device 102 initiating purchase of a new device, analyzes the data associated to that user and/or the device 102 belonging to the user stored in the user interaction history data store 122. This analysis, in part, seeks to cluster users and/or devices 102 according to technical self-reliance. This may comprise distinguishing two clusters: users who can be expected to self-service their upgrades and users who should be encouraged to come to a retail store to receive their upgrade device, to have staff activate the device and transfer user data from an old device to the upgrade device, and to receive a brief tutorial on functionality of the device. The analysis can take into consideration a frequency of calls to customer care and complexity of technical problems reported in those calls to care. The analysis can take into consideration the complexity of the old device versus the complexity and technology of the upgrade device. For example, a user who is migrating from a feature phone with push-buttons to a glass interface on a smart phone may need some initial coaching to avoid user frustration. Such a user might likewise welcome being cautioned about the fragility of the glass interface and the undesirability of dropping the device and thereby cracking this glass interface. Such a user might welcome being advised of screen protectors or device sleeves that can reduce the susceptibility of the device and/or glass interface to damage resulting from dropping impacts.

The server application 120 may send a notification to the device 102 that pops-up a dialog window on a display that suggests the user of the device (e.g., a user clustered with other users best advised to pick-up their upgrade device in a retail store) pick-up his or her upgrade device in a retail store. The server application 120 can request the client application 114 or other application on the device 102 to determine a current position of the device 102 and send that to the server application 120. For example, the client application 114 may request current GPS coordinates from a GPS device on the device 102 and transmit GPS coordinates to the server application 120. The server application 120 can determine, based on the current GPS coordinates of the device 102, one or more retail stores 126, 130 that are close to the device 102. The server application 120 can send a request to an inventory management system 124 that tracks stock of upgrade devices and can identity which of the retail stores 126, 130 carry the upgrade model in which the user of the device 102 has indicated interest. The server application 120 can further consult personal scheduling systems of the retail stores 126, 130 to identify availability of personnel qualified to activate the selected upgrade model, to transfer personal data from the device 102 to the upgrade device, and to provide any desired overview of the function of the upgrade device.

The server application 120 can then send a notification to the device 102 suggesting the user of the device 102 pick-up the upgrade device at the selected retail store 130 that has the desired upgrade model in stock 132 at that location and provide an appointment time. The user may accept the appointment time, and the sever application 120 may then place a temporary hold on a specific instance of the upgrade device (i.e., a device with a specific unique identifier such as a specific serial number or MEID) currently in the stock 132 at the selected retail store 130. Additionally, the server application 120 may commit the appointment time in a scheduling system of the retail store 130. Because the selected upgrade model may be of limited availability, as in the early days of a roll-out of a new flagship mobile communication device, the temporary hold may be released if the user does not keep his or her appointment. While the hold on the specific instance of the upgrade device is active, if an attempt is erroneously made to sell the specific instance of the upgrade device to another, a provisioning system 140 of the wireless communication service provider blocks attempts to activate the device to a different user. Said in other words, the temporary hold is enforced in the provisioning system 140 of the wireless communication service provider. The temporary hold may further be notified through other systems, such as through an in-store stock management system or interface.

When the mobile communication device 102 (e.g., the old device) enters the selected retail store 130, the WiFi radio transceiver 136 of the device 102 may handshake with a WiFi access point (AP) 134 in the selected retail store 130. The WiFi AP 134 may interwork with the server application 120 or a personnel scheduling system in the selected retail store 130 to learn of the appointment of the user associated with the UE 102. Notification of the arrival of the user associated with the UE 102 may be provided to the store employee who is scheduled to meet with the user of the UE 102 and set-up the specific instance of the upgrade model for the user of the UE 102. A notification may be sent to the UE 102, for example by the server application 120 or by an in-store system, via the WiFi AP 134 to the device 102 indicating an in-store contact person will soon greet them and bring their upgrade model to them.

In an embodiment, the WiFi AP 134 may send an interface to the device 102 to select personal data for porting to the upgrade model. This action may simply identify the personal data for porting whereby to speed the porting process to take place later. Alternatively, this action may initiate transfer of personal data to the WiFi AP 134 and therethrough to the specific instance of the upgrade model.

When the contact meets with the user of the device 102, he or she may activate the specific instance of the upgrade model for the user's wireless communication subscription account and deactivate the old device 102. The contact may further port personal data to the specific instance of the upgrade model. When the specific instance of the upgrade model is activated and set-up, the contact may ask the user to select certain configuration options that the contact can quickly set on their behalf. The contact may then explain some of the key features of the upgrade model that the user may not be familiar with—either because the features are new with this upgrade model or because the user is migrating from a different class of device (e.g., a feature phone) to a more complicated class of device (e.g., to a deluxe smart phone using a glass touchscreen interface).

The interaction history data store 122 can also be analyzed to support other opportunities to improve user satisfaction and to make the wireless communication service provider's network operate more efficiently. For example, the server application 120 can analyze the user history data to see if a pattern of problems has been experienced by the device 102, for example a pattern of problems that has a well-known remedy available such as replacing a battery or reconfiguring a device setting. If the server application 120 finds that the device events reported by the client application 114 to the user interaction history data store 122 match a predefined pattern, the server application 120 can send a notification to the device 102 suggesting the user bring the device into a retail store 126, 130 for application of a remedy. The server application 120 can request the current location of the device 102 and suggest the user visit a retail store 126, 130 proximate to the current location of the device 102. The server application 120 may further suggest an appointment time when a qualified technician can meet with the user of the device 102 and perform the desired remedial action.

In an embodiment, the server application 120 may track location of devices 102, and when a device is deemed proximate to a retail store 126, 130, the server application 120 selectively executes the process of searching events associated with that specific device 102 and matching to known problems. This may be referred to as opportunistic analysis. When the device 102 that has been analyzed does in fact exhibit a predefined event pattern, the server application 120 can then send a notification suggesting the user visit the subject proximate retail store 126, 130 to have the remedial action performed by store personnel.

Figure 2A:
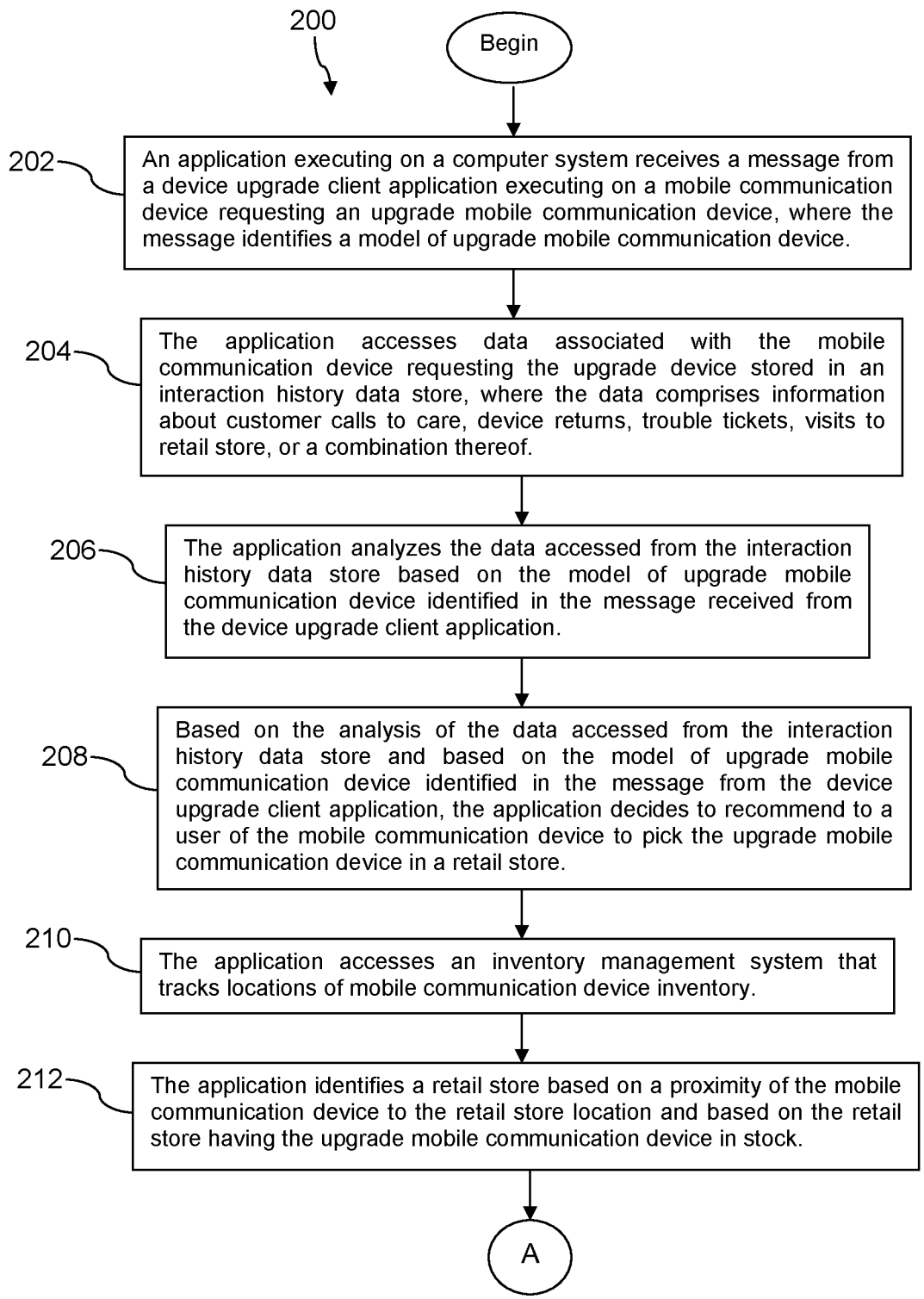
FIG. 2A and FIG. 2B are a flow chart of a method according to an embodiment of the disclosure.
Figure 2B:
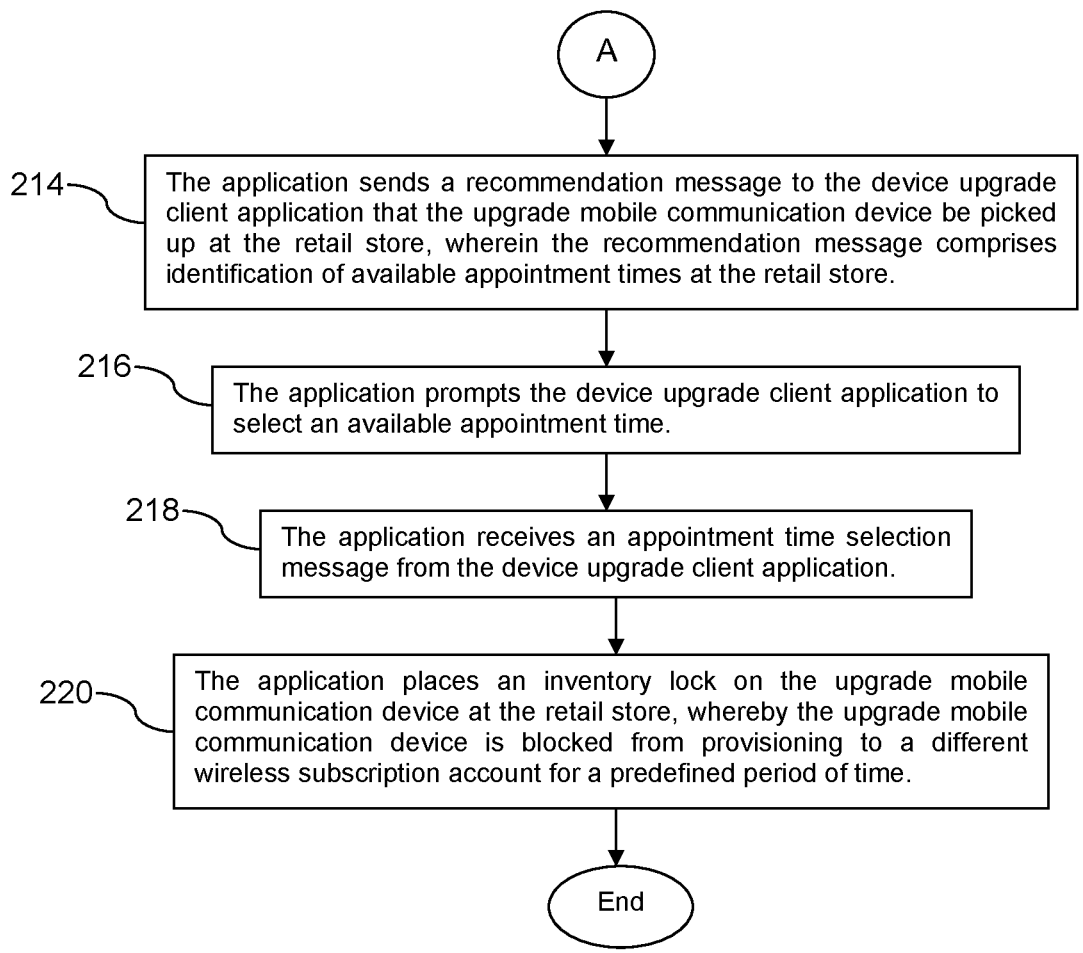

Turning now to FIG. 2A and FIG. 2B, a method 200 is described. At block 202, an application executing on a computer system receives a message from a device upgrade client application executing on a mobile communication device requesting an upgrade mobile communication device, where the message identifies a model of upgrade mobile communication device. At block 204, the application accesses data associated with the mobile communication device requesting the upgrade device stored in an interaction history data store, where the data comprises information about customer calls to care, device returns, trouble tickets, visits to retail store, or a combination thereof. At block 206, the application analyzes the data accessed from the interaction history data store based on the model of upgrade mobile communication device identified in the message received from the device upgrade client application. For example, the application may make the inference that the user who is ordering a new device is not very technically inclined based on the analysis of the data.

At block 208, based on the analysis of the data accessed from the interaction history data store and based on the model of upgrade mobile communication device identified in the message from the device upgrade client application, the application decides to recommend to a user of the mobile communication device to pick the upgrade mobile communication device in a retail store. For example, the application may have determined at block 206 that the user ordering the device upgrade may not be technically inclined. At block 210, the application accesses an inventory management system that tracks locations of mobile communication device inventory. At block 212, the application identifies a retail store based on a proximity of the mobile communication device to the retail store location and based on the retail store having the upgrade mobile communication device in stock.

At block 214, the application sends a recommendation message to the device upgrade client application that the upgrade mobile communication device be picked up at the retail store, wherein the recommendation message comprises identification of available appointment times at the retail store. At block 216, the application prompts the device upgrade client application to select an available appointment time. The processing of block 216 may involve accessing a personnel scheduling system at the retail store 130 to find what staff currently working at the store 130 are qualified for the subject upgrade model and what their immediate availability is. At block 218, the application receives an appointment time selection message from the device upgrade client application. At block 220, the application places an inventory lock on the upgrade mobile communication device at the retail store, whereby the upgrade mobile communication device is blocked from provisioning to a different wireless subscription account for a predefined period of time, for example for 15 minutes, for 20 minutes, for 45 minutes, or for some other period of time. For example the provisioning system 140 prevents provisioning the device to a different subscriber account while the inventory lock is in effect.

It is understood that, in a practical implementation, the processing of method 200 will be performed for a plurality of different mobile communication devices, and the recommendations and follow-on processing can be different for each different device. For example, a first mobile communication device may receive a recommendation to pick-up a new device at the retail store, based on event history associated with the first device and/or based on the new device selected by the user of the first device; a second mobile communication device may receive a recommendation to order a new device on-line for direct-to-home delivery, based on event history associated with the second device and/or based on the new device selected by the user of the third device; a third mobile communication device may receive a recommendation of yet a different type along with appropriate follow-on processing, based on event history associated with the third device and/or based on the new device selected by the user of the third device. Said in another way, the receipt of a message from a device upgrade client from a device may initiate the processing of method 200, and the specific processing performed—for example recommendations formulated and follow-on processing—depends on the specifics of that particular device: each message receipt is processed independently, based on the germane facts and device event history.

Turning now to FIG. 3, a method 230 is described. At block 232, an application executing on a computer accesses data associated with a mobile communication device in an interaction history data store, where the data comprises information about customer calls to care, device returns, trouble tickets, visits to retail store, or a combination thereof. At block 234, the application accesses data about a state of the mobile communication device, where the data comprises information about mobile communication device reboot events and battery based device shut-off events. At block 236, the application analyzes the data from the interaction history data store and the data comprising information on device events.

At block 238, based on the analyzing, the application sends a first message to the mobile communication device recommending the mobile communication device be brought into a first mobile communication device retail store, where the first message identifies appointment times available at the first store. At block 240, the application monitors a location of the mobile communication device. At block 242, the application determines that the mobile communication device is proximate to the location of a second device retail store. At block 244, based on determining the mobile communication device is proximate to the location of the second device retail store, the application sends a second message to the mobile communication device offering to address a technical issue on the device and offering to make a technician available at the time a user of the mobile communication device arrives at the second retail store.

Figure 4:
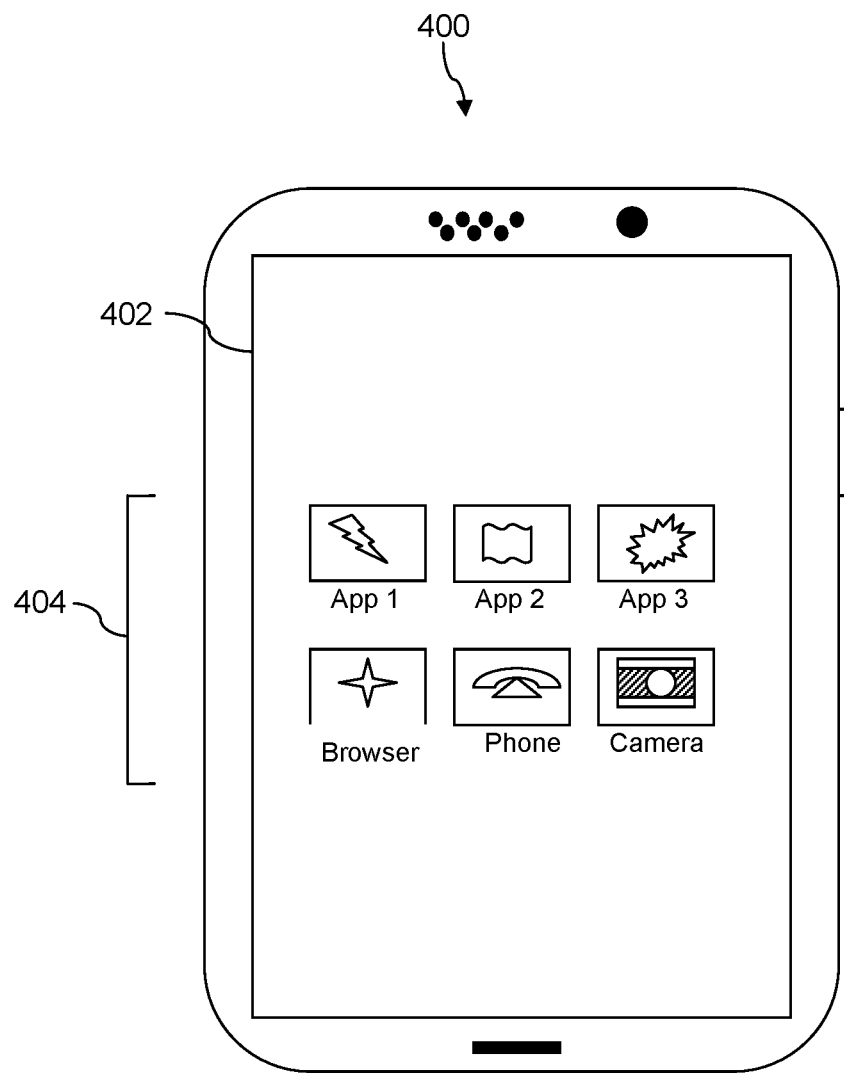
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
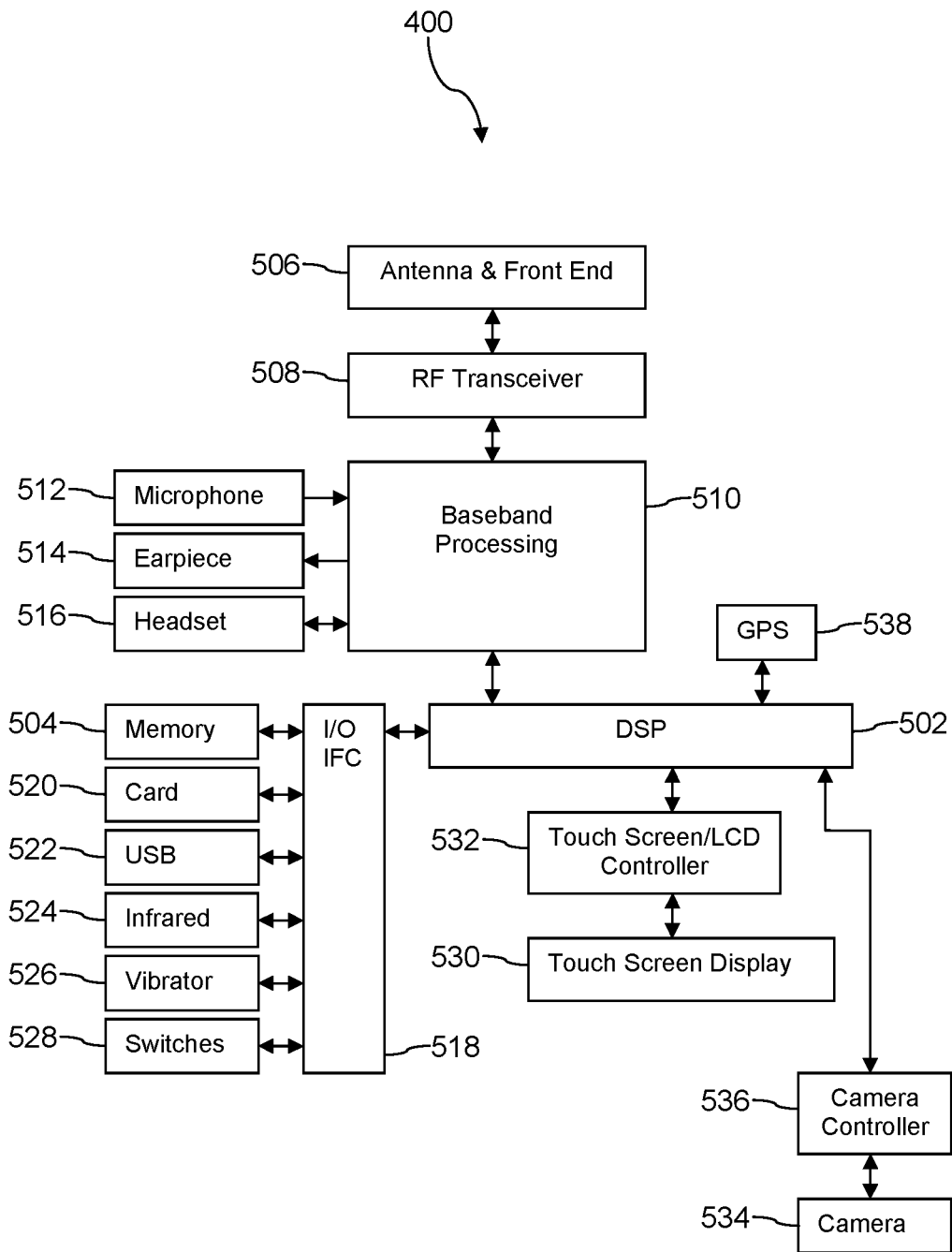
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
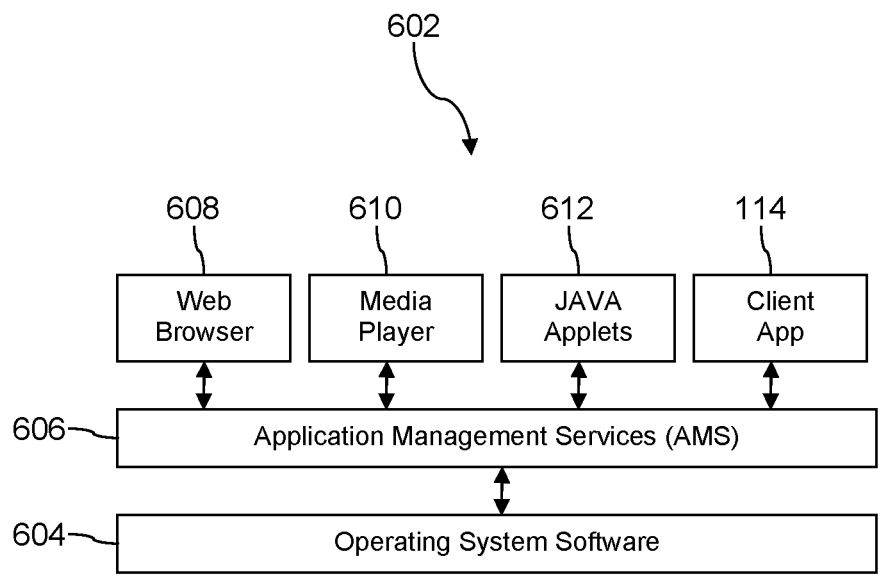
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
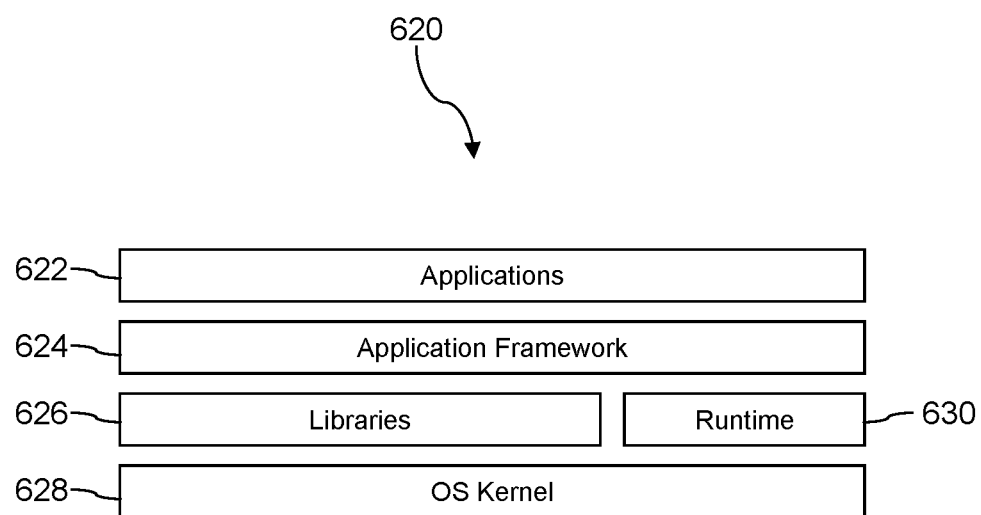
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
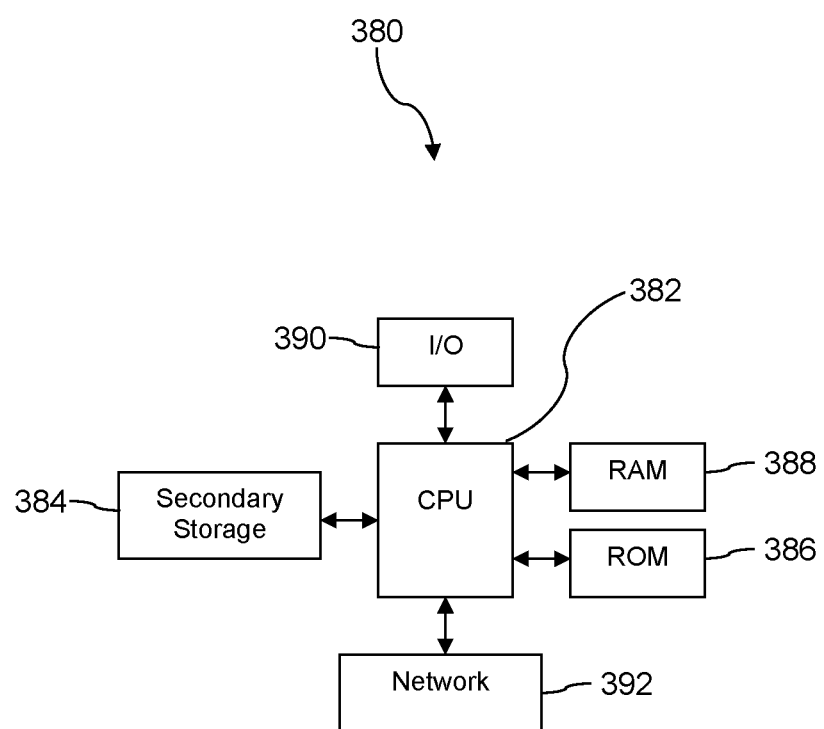
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile and/or non-transitory storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile and/or non-transitory memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for mobile communication device upgrade delivery and configuration, comprising:
   a processor;
   a non-transitory memory;
   a business process management application stored in the non-transitory memory that, when executed by the processor:
   receives a message from a device upgrade client application executing on a mobile communication device requesting an upgrade mobile communication device, where the message identifies a model of the upgrade mobile communication device,
   accesses data associated with the mobile communication device requesting the upgrade mobile communication device stored in an interaction history data store, where the data comprises information about customer calls to care, device returns, trouble tickets, visits to retail store, or a combination thereof, analyzes the data accessed from the interaction history data store based on the model of the upgrade mobile communication device identified in the message received from the device upgrade client application to determine a technical self-reliance of a user of the mobile communication device requesting the upgrade mobile communication, wherein the technical self-reliance of the user is determined at least partially according to a rate of adoption of new technology by the user or a volume of customer calls to care initiated by the user, when the user is determined to not be technically self-reliant, and based on the model of the upgrade mobile communication device identified in the message from the device upgrade client application:

recommends to the user to pick-up the upgrade mobile communication device in a retail store, accesses an inventory management system that tracks locations of mobile communication device inventory, identifies a retail store based on a proximity of the mobile communication device to the retail store location and based on the retail store having the upgrade mobile communication device in stock, sends a recommendation message to the device upgrade client application that the upgrade mobile communication device be picked up at the retail store, wherein the recommendation message comprises identification of available appointment times at the retail store, prompts the device upgrade client application to select an available appointment time, receives an appointment time selection message from the device upgrade client application, and places an inventory lock on the upgrade mobile communication device at the retail store, whereby the upgrade mobile communication device is blocked from provisioning to a different wireless subscription account, other than a wireless subscription account of the user, for a predefined period of time, receives a second message from a second device upgrade client application executing on a second mobile communication device associated with a second user requesting a second upgrade mobile communication device, where the second message identifies a model of the second upgrade mobile communication device, accesses second data associated with the second mobile communication device requesting the second upgrade mobile communication device stored in the interaction history data store, where the second data comprises information about customer calls to care, device returns, trouble tickets, visits to retail store, or a combination thereof, analyzes the second data based on the model of the second upgrade mobile communication device, and based on the analysis of the second data and based on the model of the second upgrade mobile communication device, determines the second user to be technically self-reliant and:

decides to recommend to the second user to have the second upgrade mobile communication device shipped to the second user for self-setup, and sends a recommendation message to the second device upgrade client application that the second upgrade mobile communication device be shipped to the second user; and a provisioning system configured to:

provision the upgrade mobile communication device to the wireless subscription account of the user while the inventory lock is in effect, and provision the second upgrade mobile communication device to a wireless subscription account of the second user in response to the recommendation message.

2. The system of claim 1, further comprising the business process management application receiving a current location of the mobile communication device, and wherein the proximity of the mobile communication device to the retail store location is determined based on the current location.

3. The system of claim 2, further comprising the business process management application sending a request to the device upgrade client application for the current location of the mobile communication device.

4. The system of claim 1, wherein the business process management application further receives a bundle of device events from the device upgrade client application and stores the bundle of device events in the interaction history data store and wherein the data accessed by the business process management application from the interaction history data store further comprises information from the bundle of device events.

5. The system of claim 4, wherein the bundle of device events comprise a mobile application installation event.

6. The system of claim 4, wherein the bundle of device events comprise a display screen reconfiguration event.

7. A method of delivering and configuring a mobile communication device, comprising:

receiving a message by an application executing on a computer system from a device upgrade client application executing on a mobile communication device requesting an upgrade mobile communication device, where the message identifies a model of the upgrade mobile communication device, accessing data associated with the mobile communication device requesting the upgrade mobile communication device stored in an interaction history data store by the application, where the data comprises information about customer calls to care, device returns, trouble tickets, visits to retail store, or a combination thereof, analyzing the data accessed from the interaction history data store by the application based on the model of the upgrade mobile communication device identified in the message received from the device upgrade client application, based on the analysis of the data accessed from the interaction history data store and based on the model of the upgrade mobile communication device identified in the message from the device upgrade client application, recommending to a user of the mobile communication device to pick up the upgrade mobile communication device in a retail store, accessing an inventory management system that tracks locations of mobile communication device inventory by the application, identifying a retail store based on a proximity of the mobile communication device to the retail store location and based on the retail store having the upgrade mobile communication device in stock, sending a recommendation message to the device upgrade client application by the application that the upgrade mobile communication device be picked up at the retail store, wherein the recommendation message comprising identification of one or more available appointment times at the retail store, prompting the device upgrade client application to select an available appointment time of the one or more available appointment times, receiving an appointment time selection message from the device upgrade client application by the application, placing an inventory lock on the upgrade mobile communication device by communicating via the computer system to a provisioning system, an instruction that prevents the upgrade mobile communication device from provisioning to a wireless subscription account, other than a wireless subscription account of the user, for a predefined period of time, and wherein preventing the upgrade mobile communication device from provisioning to the wireless subscription account prevents the upgrade mobile communication device from being activated to receive network access, and while the inventory lock is in effect, provisioning, by the provisioning system, the upgraded mobile communication device to the wireless subscription account of the user.

8. The method of claim 7, further comprising receiving a current location of the mobile communication device by the application, and wherein the proximity of the mobile communication device to the retail store location is determined based on the received current location.

9. The method of claim 7, further comprising sending a request by the application to the device upgrade client application for the current location of the mobile communication device.

10. The method of claim 7, further comprising:
receiving a bundle of device events by the application from the device upgrade client application; and
storing the bundle of device events in the interaction history data store, wherein the data accessed by the application from the interaction history data store further comprises information from the bundle of device events.

11. The method of claim 10, wherein the bundle of device events comprise a mobile application installation event.

12. The method of claim 10, wherein the bundle of device events comprise a display screen reconfiguration event.

13. The system of claim 1, wherein the mobile communication device is a feature phone comprising a push-button interface and the upgrade mobile communication device is a smartphone comprising a glass touchscreen interface.

* * * * *